July 7, 1931.  H. T. KRAFT  1,813,880

METHOD OF MAKING MOLDS

Filed Sept. 6, 1927

Inventor
Herman T. Kraft,

Patented July 7, 1931

1,813,880

UNITED STATES PATENT OFFICE

HERMAN T. KRAFT, OF AKRON, OHIO, ASSIGNOR TO THE GOODYEAR TIRE & RUBBER COMPANY, OF AKRON, OHIO, A CORPORATION OF OHIO

METHOD OF MAKING MOLDS

Application filed September 6, 1927. Serial No. 217,580.

This invention relates to methods of making molds, and it has particular relation to making molds adapted for use in the vulcanization of tire casings and to a method by which such mold may be advantageously manufactured.

Tire vulcanizing molds have heretofore been made by casting or forging, both of which methods produce molds only roughly approximating the contour desired. The machining of such molds, particularly the tread forming section thereof, requires considerable time and, therefore, represents a large portion of the complete cost of the finished mold.

It has also been proposed to make tire molds by first casting a flexible matrix, then electroplating or otherwise applying a thin metallic shell upon the flexible matrix, and finally disposing this shell within a mold and casting a backing thereon. Although this method obviates the necessity for machining the mold, it is complicated and, due to the fact that two matrices are made, one from the other, there is more possibility of producing a defective mold than by the casting or forging methods.

One object of my invention is to provide a simple and efficient method of making tire molds by the practice of which molds are produced with their interior surfaces having the desired contour without machining thereof.

Another object of the invention is to provide a method of making tire molds wherein a tire or similar flexible form is employed as a matrix upon which the mold is formed.

A further object of the invention is to provide a method of making tire molds which involves the formation of the complete mold by spraying molten metal upon an inflated tire casing.

In the accompanying drawings forming a part of the disclosure;

Figure 1:
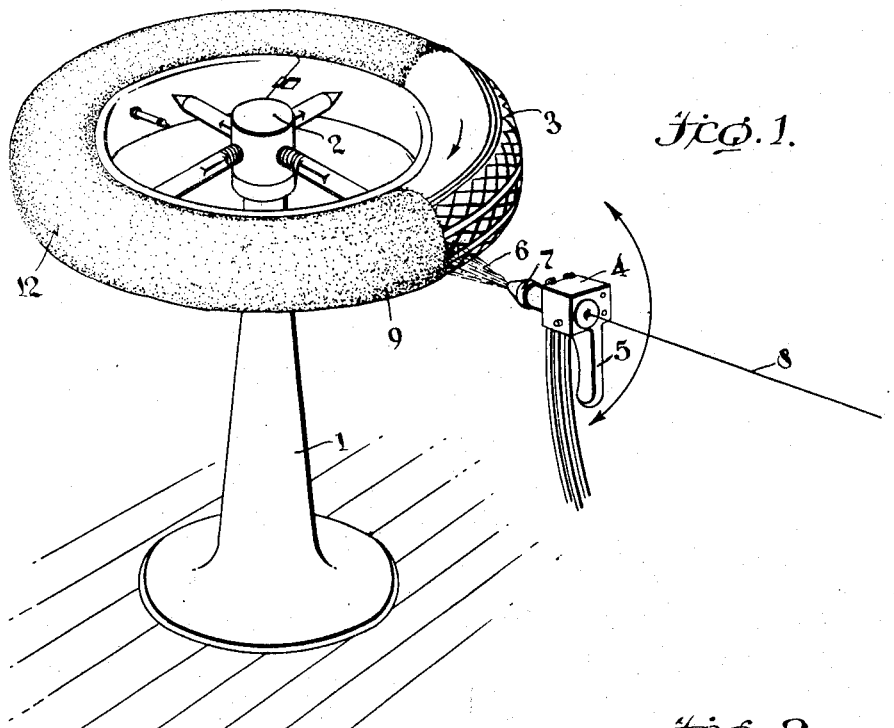
Fig. 1 is a perspective view illustrating a tire rotatably mounted in a horizontal position on a stand, together with a combined pneumatic and electric torch by which molten metal is sprayed upon the tire.

In the accompanying drawings, I have shown, for illustrative purposes, one form of apparatus which may be employed for constructing tire molds in accordance with my invention. As shown, this apparatus comprises a stand 1, rotatably supporting upon its upper end, a hub 2. This hub is provided with means for supporting an inflated tire 3 in a horizontal plane to rotate therewith.

A combination pneumatic and electric spray device 4, which is conventional and forms no part of the present invention, is preferably utilized for spraying molten metal upon the exterior of the tire casing 3. The device 4 is designed to be manipulated by means of a handle 5, and functions to continually eject a spray 6 of molten metal from its nozzle 7. A wire 8, which is continuously drawn into the device from a reel or the like (not shown), is reduced to fluid form in the device 4.

Figure 2:
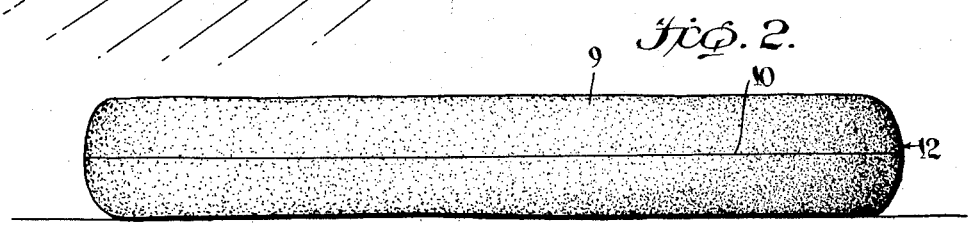
Fig. 2 is a side elevational view of a mold formed in accordance with my invention.

In the practice of my invention, a tire 3 is mounted upon the stand 1 and inflated to a desired degree. A shell 9 of considerable thickness is then formed upon the tire by means of the spray device 4, the tire being rotated about the vertical axis of the stand 1 as the molten metal is applied thereto. The coated tire is then removed from the stand, after which the tire and tube are removed from the metallic shell 9, the shell being cut centrally, as indicated at 10 in Fig. 2, to produce a complete two-part mold. The interior surface of the mold sections will be found to present in intaglio a practically perfect representation of the contour of the tire and consequently no machining of the surface is required.

Figure 4:
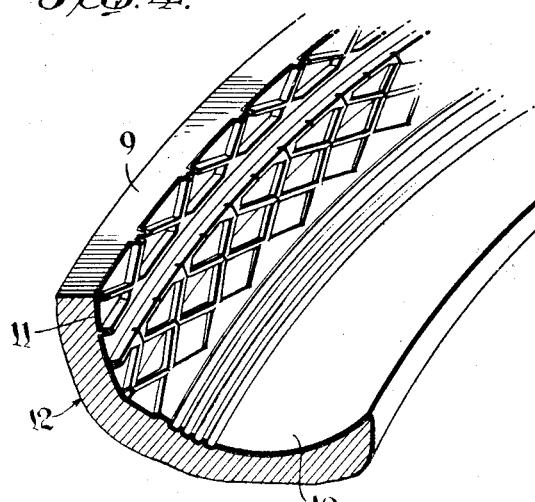
Fig. 4 is a fragmentary perspective view of a portion of the mold section shown in Fig. 3.
Figure 3:
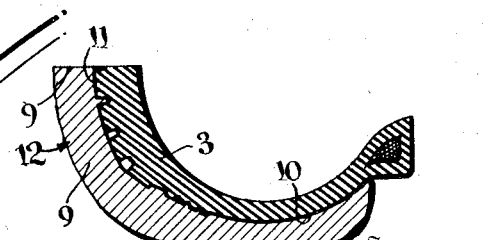
Fig. 3 is a fragmentary sectional view, on a larger scale, of one half of a modified form of mold having a portion of a tire mounted therein.

If desired, a conducting substance may be applied to the exterior of the tire 3, and the tire then disposed within an electroplating bath until a thin shell 11 of metal has been deposited thereon, after which the mold may be completed as above described by the spraying of molten metal upon the shell thus provided. The thin shell obtained by the electroplating process is shown in Figs. 3 and 4 of the drawings. In both instances, however, the major portion of the tire mold 12 is composed of material sprayed upon a flexible casing by the spray device 4.

Although I have herein specifically described only one method illustrative of my invention, it is obvious that the principles thereof may be utilized to advantage in the production of other articles without departing from the spirit or scope of the invention, and I desire therefore that no limitations shall be imposed except such as are indicated in the appended claims.

What I claim is:

1. The method of making a tire mold which consists in inflating a tire, spraying molten metal upon said tire to form a matrix shell, deflating the tire and removing the matrix shell.

2. A method of making a tire mold which includes inflating an inflatable flexible form, spraying mold material upon the inflated flexible form employed as a matrix to form a tire shaped metal shell thereon, and splitting the shell on a circumferential line to facilitate removal of the shell.

3. The method of making a tire mold which includes inflating an expansible member within a tire casing, spraying molten metal on the exterior of the casing, deflating said expansible member and cutting the metallic body thus obtained centrally along a circumferential line to provide a two-part mold.

In witness whereof, I have hereunto signed my name.

Signed at Akron, in the county of Summit and State of Ohio, this 2nd day of September, 1927.

HERMAN T. KRAFT.